(12) United States Patent
Maangat

(10) Patent No.: US 7,042,255 B1
(45) Date of Patent: *May 9, 2006

(54) PROGRAMMABLE DIFFERENTIAL CAPACITANCE FOR EQUALIZATION CIRCUITS

(75) Inventor: Simar Maangat, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,368

(22) Filed: Mar. 8, 2005

Related U.S. Application Data (63) Continuation of application No. 10/652,863, filed on Aug. 28, 2003, now Pat. No. 6,870,404.

(51) Int. Cl.
*H03K 5/22* (2006.01)
(52) U.S. Cl. .......................... 327/65; 327/111
(58) Field of Classification Search ................ 327/65, 327/111, 337, 564–566; 330/253, 254, 277, 330/278
See application file for complete search history.

(56) References Cited

U.S. PATENT DOCUMENTS

| | | | |
|---|---|---|---|
| 4,918,654 A | 4/1990 | Eaton, Jr. et al. | 365/145 |
| 5,966,047 A | 10/1999 | Anderson et al. | 327/565 |
| 6,301,176 B1 | 10/2001 | Brown | 365/203 |
| 6,316,997 B1 | 11/2001 | Tammone, Jr. | 330/254 |
| 6,356,135 B1 | 3/2002 | Rastegar | 327/337 |
| 6,642,781 B1 | 11/2003 | Eker et al. | 327/231 |
| 6,653,673 B1 | 11/2003 | Trimberger | 257/208 |

*Primary Examiner*—Linh My Nguyen
(74) *Attorney, Agent, or Firm*—Fish & Neave IP Group of Ropes & Gray LLP; Robert R. Jackson; Hong S. Lin (57) ABSTRACT

Programmable differential capacitance is implemented in equalization circuits. The programmable differential capacitance improves the common mode rejection ratio of circuits processing differential signals of various frequencies and voltage swings. Multiple capacitance devices provide the programmable capacitance, which provides an equalization circuit with different, selectable (i.e., programmable) values of capacitance for boosting the transition speed and strength of differential signals processed by the equalization circuit.

9 Claims, 6 Drawing Sheets

PROGRAMMABLE DIFFERENTIAL CAPACITANCE FOR EQUALIZATION CIRCUITS

CROSS REFERENCE TO RELATED APPLICATION

This is a continuation of U.S. patent application Ser. No. 10/652,863, filed Aug. 28, 2003, now U.S. Pat. No. 6,870,404, which is incorporated by reference herein in its entirety.

BACKGROUND OF THE INVENTION

This invention relates to equalization circuits. More particularly, this invention relates to equalization circuits that have programmable differential capacitance to improve performance.

Known equalization circuits often employ capacitance devices to improve signal transition speed and strength when responding to the transition of an incoming signal. Equalization circuits are typically used with differential signaling (such as low voltage differential signaling (LVDS) or current mode logic (CML) signaling). Differential signals are pairs of signals that propagate in parallel. Each is usually a logical complement of the other. That is, when one signal is at a high voltage (e.g., a "logical 1"), the other is at a low voltage (e.g., a "logical 0"), and vice versa. The equalization circuit operates on both signals substantially simultaneously.

Differential signals (e.g., V1 and V2) can be equivalently thought of as a difference signal (i.e., V1−V2) and a common mode signal (i.e., ½(V1+V2)). Similarly, any gain provided by the equalization circuit to the two signals (e.g., A1 and A2) can be equivalently thought of as a difference gain (Ad=½(A1−A2)) and a common mode gain (Ac=A1+A2)). The relative sensitivity of a circuit to a difference signal as compared to a common mode signal is known as the common-mode rejection ratio (CMRR=Ad/Ac). Many circuits are required to respond precisely to the difference signal. Such circuits should have a high CMRR (i.e., low common mode signal gain/high common mode signal rejection). This will at least lessen, if not eliminate, the adverse effects of common mode signal noise.

Known equalization circuits, however, may have the disadvantage of relatively poor common mode signal noise rejection, resulting in a low CMRR. A low CMRR can result in data errors (e.g., a logical 0 being incorrectly interpreted as logical 1 and/or vice versa). Such errors can adversely affect an entire system.

SUMMARY OF THE INVENTION

In accordance with the invention, equalization circuitry is provided that includes programmable differential capacitance. This programmable capacitance allows different values of capacitance to be selectively conductively coupled within an equalization circuit to customize and optimize circuit performance under different conditions and for different applications. A selected value of capacitance determines the degree to which common mode noise rejection and signal transition speed and strength are improved. The programmable capacitance can be provided by varactors or capacitors.

Methods of equalizing voltage transitions of differential signals via programmable differential capacitance are also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
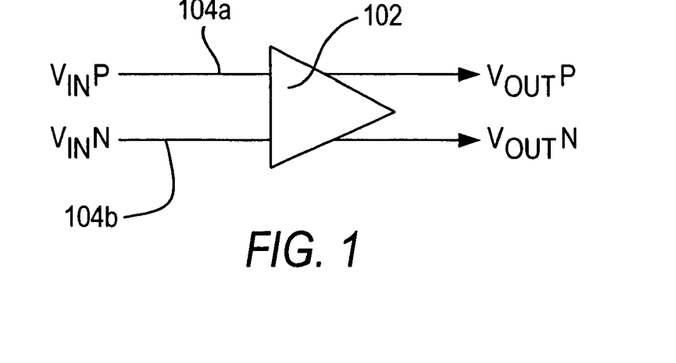
FIG. 1 is a simplified block diagram of a buffer or driver equalizer that can be constructed in accordance with the invention.

FIG. 1 shows an input driver or buffer 102 typically found in digital data receiver circuits. Driver 102 receives digital data information via a pair of conductors 104a,b (e.g., signal wires)—using differential signaling. As is well known by those skilled in the art, differential signaling typically means that different digital data values (i.e., logical 0 and logical 1) are signaled via conductors 104a,b in accordance with whether the voltage on conductor 104a is higher than the voltage on conductor 104b or vice versa. For example, a logical 1 value may be indicated by the voltage on conductor 104a being higher than the voltage on conductor 104b. A logical 0 value may be indicated by the voltage on conductor 104b being higher than the voltage on conductor 104a. The signals on the two conductors are thus effectively complements of one another. It is typically desired in differential signaling for the average of the voltages on the two conductors to be substantially constant. This average is the so-called "common mode" voltage.

Typically, signals on conductors 104a,b are transmitted initially in good condition. However, there may be losses in those signals as they propagate through various communication links and conductors prior to reaching driver 102. This makes it desirable for the input driver circuitry that initially receives the signals from conductors 104a,b to include equalization capability to increase the strength of a receiver's response to the received signals, especially immediately adjacent to any transitions in the received signals. Such transitions signal a change from transmitting logical 1 to logical 0 or vice versa, and it is therefore especially important to strengthen that transition information so that the receiver circuitry can more rapidly begin to respond to a change in the data being transmitted. This allows systems to be operated more rapidly, more reliably, at lower voltages, and/or with various combinations of these advantages employed to various different degrees.

The signal on conductor 104a is designated VINP (P for positive), and the signal on conductor 104b is designated VINN (N for negative). Driver 102 outputs differential signals VOUTP and VOUTN that indicate the information represented by the received signals VINP and VINN. However, signals VOUTP and VOUTN are the result of equalization performed by driver 102, and these signals may also be otherwise adapted or conditioned for use by the remainder of the receiver circuitry. Although driver 102 is shown producing differential output signals (VOUTP and VOUTN), only one of these signals may be used in the downstream receiver circuitry.

Figure 2:
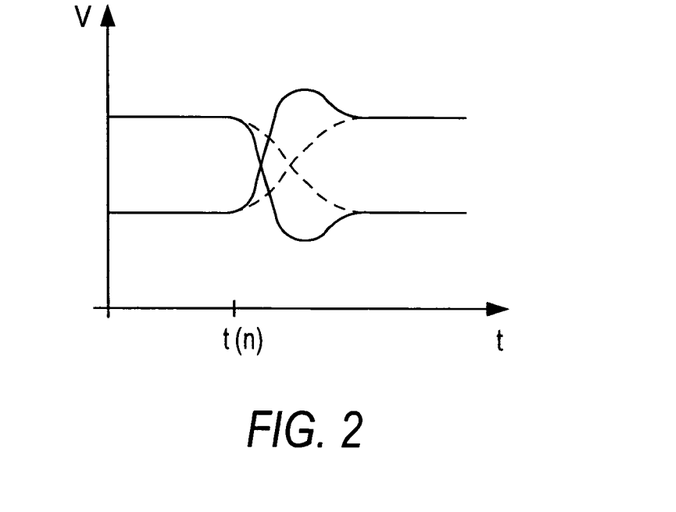
FIG. 2 is a plot of differential signal transitions that are useful in explaining certain aspects of the invention.

FIG. 2 illustrates the performance of input driver 102 with and without equalization. (Performance with equalization is shown by solid lines. Performance without equalization is shown by dotted lines.) With equalization, the output signals of driver 102 respond to a transition beginning at time t(n) of the input signals more quickly and more strongly than without equalization. FIG. 2 shows that extra-strong responses preferably take place only near the start of the input signal transitions and, after this extra-strong initial response, the output signals preferably settle back to the levels they would have had without equalization.

Figure 3:
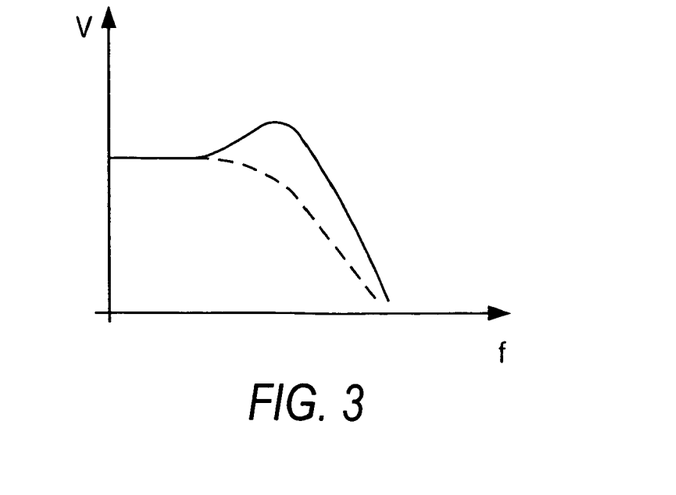
FIG. 3 is a plot of frequency response characteristics that are also useful in explaining certain aspects of the invention.

FIG. 3 is a similar illustration of input driver 102 frequency response with equalization (solid line) and without equalization (dotted line). FIG. 3 shows that equalization both extends frequency range to higher frequencies and strengthens response at high frequencies.

Figure 4:
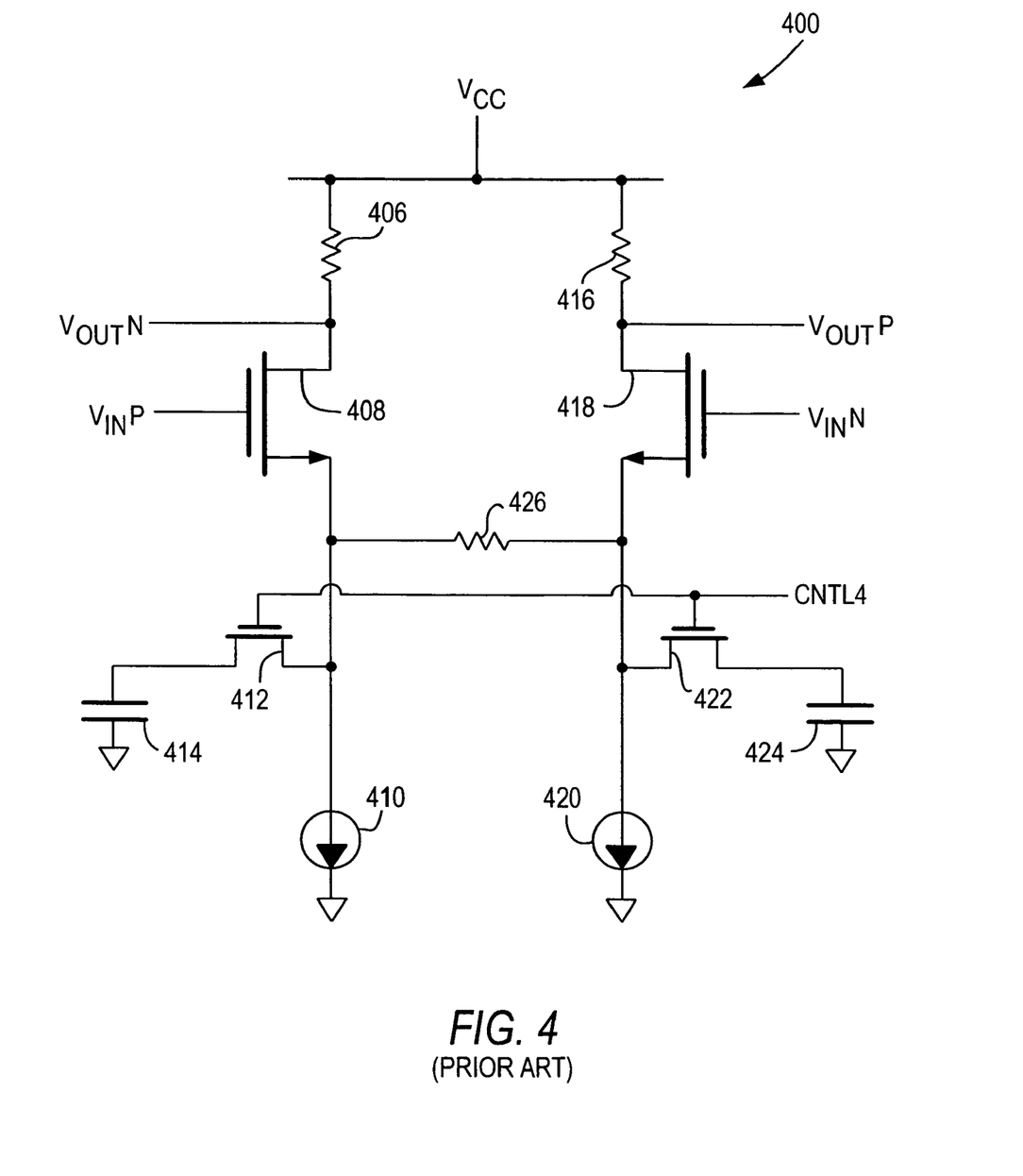
FIG. 4 is a simplified circuit diagram of a known equalization circuit.

FIG. 4 illustrates a known driver circuit having equalization capability. Driver circuit 400 has two interconnected legs; the first includes the series connection of a source of power voltage (referred to as VCC), a resistor 406, a node VOUTN, an NMOS transistor 408 (i.e., an N-channel metal-oxide-semiconductor field-effect-transistor or MOSFET), a current sink 410, and a source of ground or lower voltage (VSS) (referred to hereinafter as ground). A main terminal (i.e., either the source or drain) of an NMOS pass transistor 412 is coupled to a node between NMOS transistor 408 and current sink 410. The other main terminal of NMOS pass transistor 412 is coupled to a terminal of a capacitor 414. The other terminal of capacitor 414 is coupled to ground. NMOS pass transistor 412 operates as a switch. When a sufficiently positive voltage (e.g., a logical 1) is applied to the gate of transistor 412, a conductive path is created through transistor 412 between its drain and source (analogous to a closed switch). This conductively couples capacitor 414 to the first leg of driver 400. When a sufficiently low voltage (e.g., a logical 0) is applied to the gate, no conduction occurs through transistor 412 (analogous to an open switch). The second leg of driver circuit 400 includes the series connection of VCC, a resistor 416, a node VOUTP, an NMOS transistor 418, a current sink 420, and ground. A main terminal of an NMOS pass transistor 422 is coupled to a node between NMOS transistor 418 and current sink 420. The other main terminal of NMOS pass transistor 422 is coupled to a terminal of a capacitor 424. The other terminal of capacitor 424 is coupled to ground. The gates of NMOS pass transistors 412 and 422 are coupled to receive a control signal CNTL4 and thus operate substantially simultaneously. The node between NMOS transistor 408 and current sink 410 is coupled to the node between NMOS transistor 418 and current sink 420 by a resistor 426.

Driver circuit 400 operates preferably as follows: when VINP is high and VINN is low, transistor 408 is ON (i.e., conducts current between its drain and source) and transistor 418 is OFF (i.e., no current conducted between its drain and source). VOUTN is pulled down from VCC (e.g., to about ground) and is therefore low. VOUTP is pulled up to (or at least close to) VCC and is therefore high. With control signal CNTL4 high, pass transistors 412 and 422 are both ON. Under steady state conditions, capacitor 414 is charged and capacitor 424 is partially charged to a voltage less than that of capacitor 414.

When VINP changes from high to low (and VINN correspondingly changes from low to high), transistor 408 turns OFF (and transistor 418 turns ON). Capacitor 424 initially acts like a short circuit sinking current from transistor 418 (capacitor 424 then charges up). This causes more current to initially flow through transistor 418 than would otherwise flow if only current sink 420 were present. Consequently, VOUTP is pulled down more quickly than would otherwise happen, thereby initially amplifying the transition at VOUTP. Similarly, capacitor 414 also initially acts like a short circuit upon the transitions at VINP and VINN. However, because the direction of voltage change on capacitor 414 is opposite that on capacitor 424, capacitor 414 provides current (i.e., discharges). This current is sunk by current source 410. The source of transistor 408 no longer needs to provide as much current (it is "starved" more rapidly), allowing transistor 408 to turn OFF more quickly. Consequently, VOUTN is pulled up more quickly than would otherwise happen, thereby initially amplifying the transition at VOUTN.

An input signal transition in the opposite direction causes similar equalization effects in driver circuit 400, but with the effects in the two legs of the circuit reversed as compared to that described above.

Driver circuit 400 has the disadvantage of low (i.e., poor) common mode rejection, because common mode noise "sees" the same capacitance as the differential signal and is accordingly boosted along with the signal, increasing common mode gain, which is not desirable in differential signaling.

Figure 5:
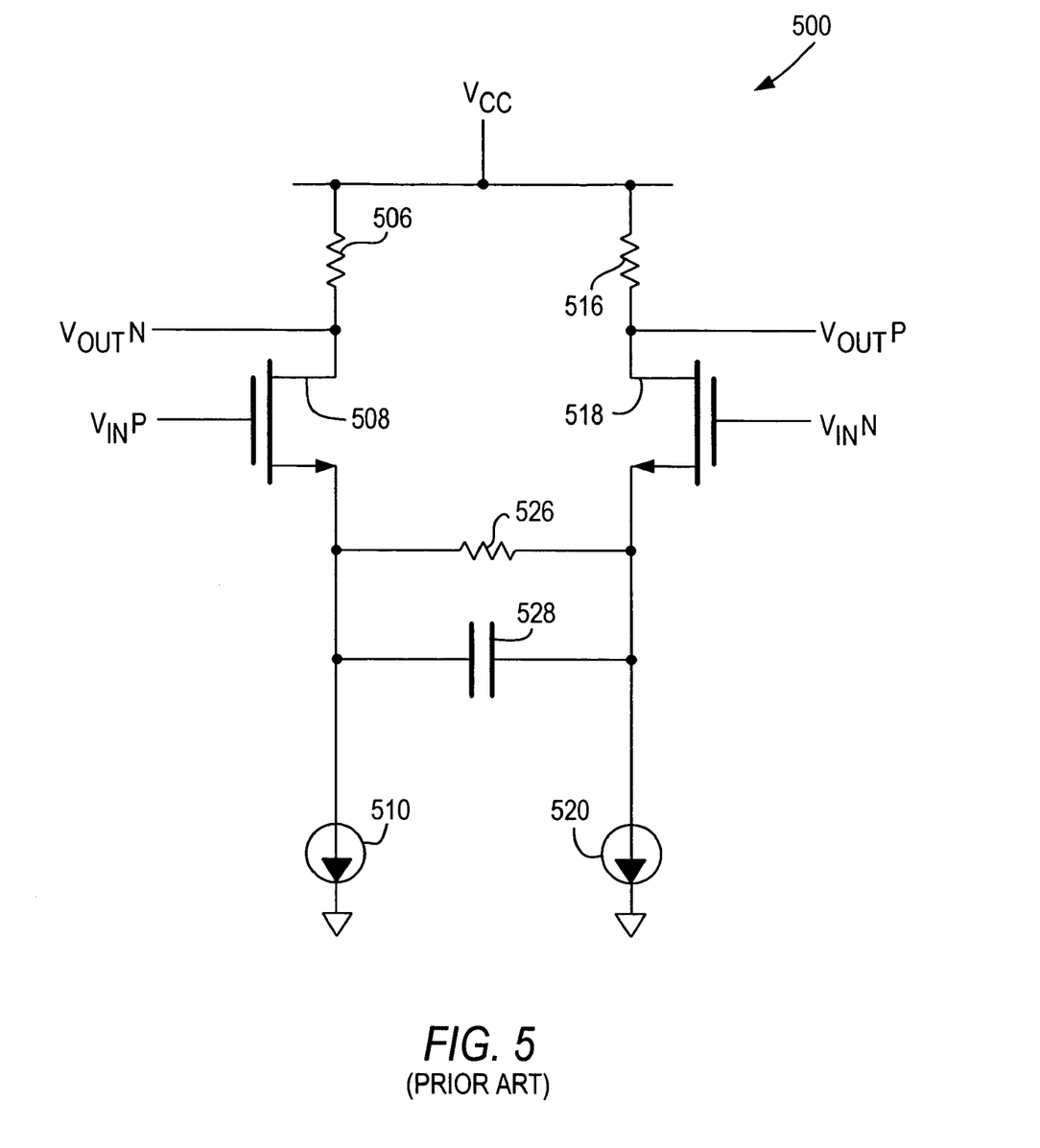
FIG. 5 is a simplified circuit diagram of another known equalization circuit.

FIG. 5 illustrates another known driver circuit having equalization capability. Driver circuit 500 has two interconnected legs; the first includes, in series, VCC, resistor 506, node VOUTN, NMOS transistor 508, current sink 510, and ground. The second leg includes, in series, VCC, resistor 516, node VOUTP, NMOS transistor 518, current sink 520, and ground. The node between NMOS transistor 508 and current sink 510 is connected to the node between NMOS transistor 518 and current sink 520 by resistor 526 and "ideal" capacitor 528, which are coupled in parallel. (Capacitor 528 is "ideal" in that its method of fabrication in driver circuit 500 is not considered.)

Driver circuit 500 operates preferably as follows: when VINP is high and VINN is low, transistor 508 is ON and transistor 518 is OFF. VOUTN is pulled down from VCC (e.g., to about ground) and is therefore low. VOUTP is pulled up to (or at least close to) VCC and is therefore high.

When VINP changes from high to low (and VINN correspondingly changes from low to high), transistor 508 turns OFF (and transistor 518 turns ON). Capacitor 528 initially acts like a short circuit, conducting current from right to left (with respect to FIG. 5). This causes more current to initially flow through transistor 518 than would otherwise flow if only current sink 520 were present. Consequently, VOUTP is pulled down more quickly than would otherwise occur, thereby initially amplifying the transition at VOUTP. The current through capacitor 528 is sunk by current source 510. As described above with respect to driver circuit 400, this sinking of current causes transistor 508 to turn OFF more quickly than would otherwise occur. VOUTN therefore rises more quickly, thus initially amplifying the transition at VOUTN. The momentary shorting out of capacitor 528 at signal transitions results in more rapid current changes in transistors 508 and 518, which provide the equalization effects. These equalization effects can be increased by increasing the resistance of resistor 526, increasing the capacitance of capacitor 528, or both. Conversely, these equalization effects can be decreased by decreasing the value of resistor 526, capacitor 528, or both.

An input signal transition in the opposite direction causes similar equalization effects in driver circuit 500, but with the effects in the two legs of the circuit reversed as compared to that described above.

Advantageously, because of the placement of capacitor 528 between the source nodes of transistors 508 and 518, common mode gain is not amplified. Common mode gain is not amplified because the voltage on both sides of capacitor 528 rise and fall substantially simultaneously for common mode inputs. Thus, no voltage change occurs across capacitor 528, which results in no current flow through capacitor 528. Accordingly, capacitor 528 acts like an open circuit and is effectively not visible to a common mode stimulus.

However, because resistor 526 and capacitor 528 have fixed values, the equalization performed by driver circuit 500 is limited. As is known by those skilled in the art, data communication involves transmission at different and typically higher and higher data rates (i.e., frequency) via differential signals at different and typically lower and lower voltage swings (i.e., the voltage difference between the two differential signals). Capacitance and current are proportionately related to each other by the rate of voltage change (i.e., by signal transition speed/frequency). Large capacitances subjected to high signal frequencies generally appear as short circuits (they never fully charge up between transitions), thus drawing more current (this allows equalization circuits to more greatly boost signal transition speed and strength as described above). Small capacitances at lower frequencies, on the other hand, generally appear as open circuits (because they charge up quickly before the next transition), thus drawing less current. Accordingly, driver circuit 500 may be relatively sensitive to common-mode noise depending on (1) the values of resistor 526 and capacitor 528 and (2) the signal frequencies and voltage swings involved. This sensitivity may limit the applications in which driver 500 can be used effectively.

Figure 6:
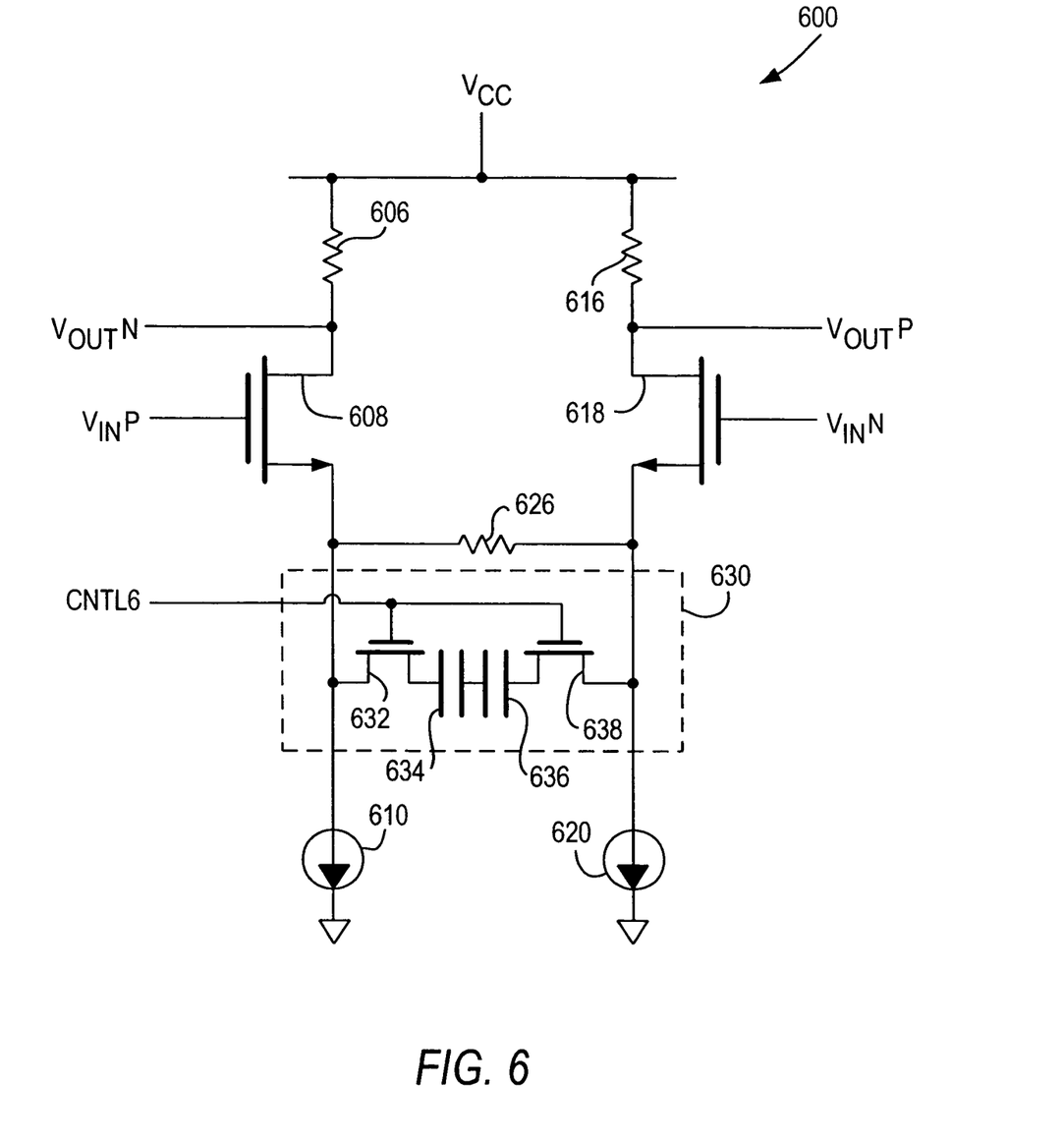
FIG. 6 is a simplified circuit diagram of an illustrative embodiment of an equalization circuit constructed in accordance with the invention.

FIG. 6 shows an illustrative embodiment of a circuit with differential signaling and equalization capability in accordance with the invention. Equalization driver circuit 600 has two interconnected legs; the first includes a series connection of VCC, resistor 606, node VOUTN, NMOS transistor 608, current sink 610, and ground. The second leg includes a series connection of VCC, resistor 616, node VOUTP, NMOS transistor 618, current sink 620, and ground. The node between NMOS transistor 608 and current sink 610 (that is, the source node or terminal of transistor 608) is coupled via resistor 626 to the node between NMOS transistor 618 and current sink 620 (that is, the source node or terminal of transistor 618). Advantageously, equalization circuitry 630 is coupled in parallel with resistor 626 between those two nodes in accordance with the invention.

Equalization circuitry 630 preferably is an integrated circuit (as preferably is driver circuit 600) and includes a series connection of an NMOS pass transistor 632, a capacitance device 634, a capacitance device 636, and an NMOS pass transistor 638. The gates of pass transistors 632 and 638 are jointly coupled to receive control signal CNTL6. Control signal CNTL6 can be generated, for example, from a multiplexer within a receiver or other circuit containing driver circuit 600. Capacitance devices 634 and 636 are preferably each a varactor, but alternatively can be one or more metal capacitors. Varactors are preferable because their capacitance values can be more precisely manufactured than those of capacitors.

Although capacitance devices 634 and 636 could be represented in FIG. 6 as a single capacitance having an equivalent capacitance value CEQ=the reciprocal of the sum of 1/C634+1/C636, they are shown as they would be preferably fabricated in known semiconductor processes: as two distinct varactors sharing the same N-well. (MOSFET semiconductor fabrication typically involves creating semiconductor devices by interconnecting differently doped regions in a semiconductor substrate (e.g., silicon). For example, an NMOS transistor can be formed by two "regions" or "wells" doped with an N-type material (e.g., phosphorus) separated by a region or substrate doped with an P-type material (e.g., boron). Various layers of metal and insulators are applied to the substrate surface to create interconnections and other devices (e.g., capacitors)).

Driver 600 operates substantially, if not identically, as described above for driver circuit 500, except that the equivalent capacitance of devices 634 and 636 can be selectively programmed in or out of driver 600 via control signal CNTL6. That is, when control signal CNTL6 is low, pass transistors 632 and 638 OFF, which conductively decouples capacitance devices 634 and 636 from driver circuit 600. When control signal CNTL6 is high, pass transistors 632 and 638 turn ON, conductively coupling capacitance devices 634 and 636 to driver circuit 600 (i.e., transistors 632 and 638 provide a conductive path from capacitance devices 634 and 636 to each of the two interconnected legs of driver circuit 600). Thus, the equalization capability of driver circuit 600 can be selected (i.e., turned ON or OFF) depending on the particular application in which driver circuit 600 is used.

Figure 7:
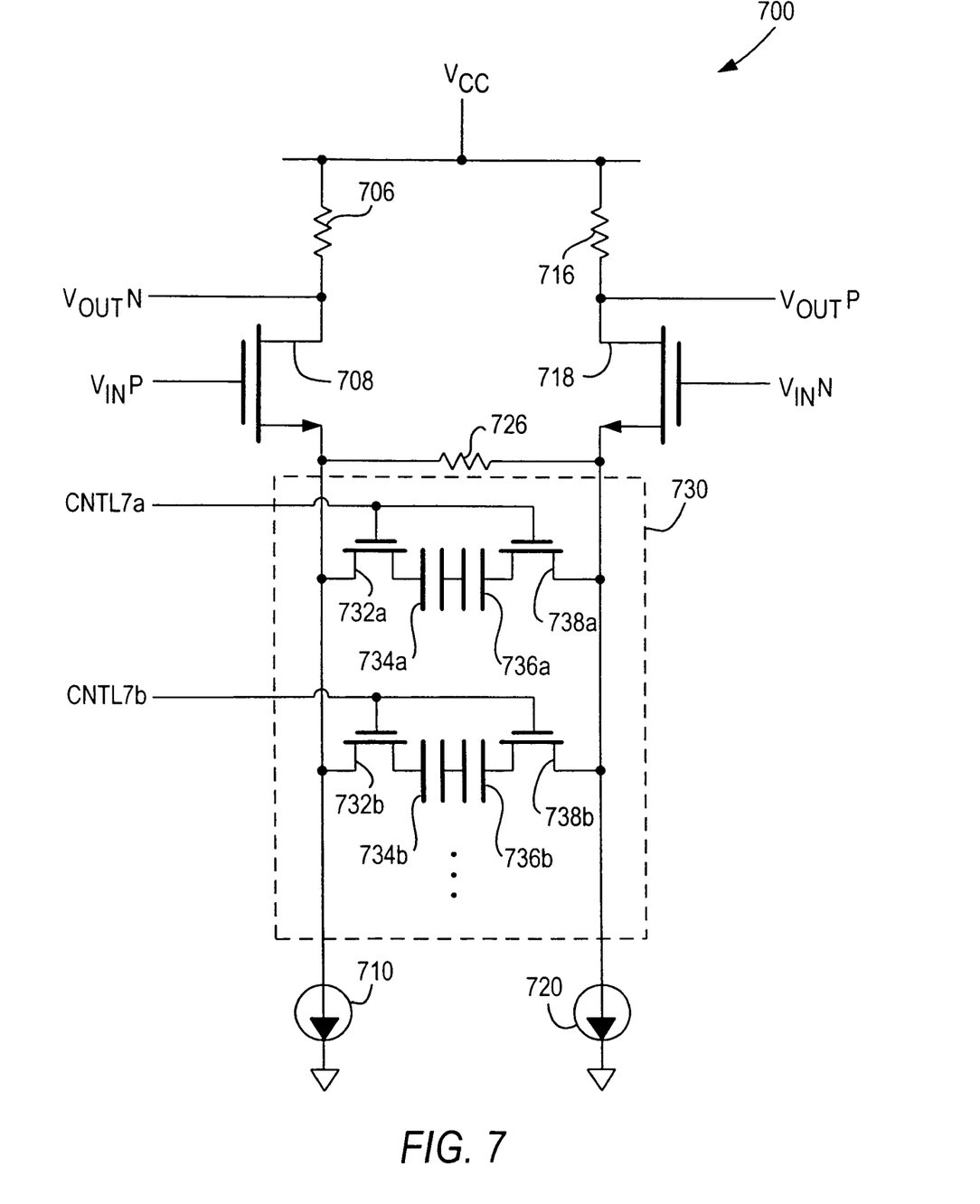
FIG. 7 is a simplified circuit diagram of another illustrative embodiment of an equalization circuit constructed in accordance with the invention.

FIG. 7 shows another illustrative embodiment of a circuit with differential signaling and equalization capability in accordance with the invention. Equalization driver circuit 700 has two interconnected legs; the first includes, a series connection of VCC, resistor 706, node VOUTN, NMOS transistor 708, current sink 710, and ground. The second leg includes a series connection of VCC, resistor 716, node VOUTP, NMOS transistor 718, current sink 720, and ground. The node between NMOS transistor 608 and current sink 710 is connected to the node between NMOS transistor 718 and current sink 720 by resistor 726. Advantageously, equalization circuitry 730 is coupled in parallel with resistor 726 between those two nodes in accordance with the invention.

Equalization circuitry 730 includes multiple series connections of two capacitance devices serially connected between two NMOS pass transistors. For example, one series connection includes NMOS pass transistor 732a, capacitance device 734a, capacitance device 736a, and NMOS pass transistor 738a. The gates of pass transistors 732a and 738a are jointly coupled to receive control signal CNTL7a. Another series connection includes NMOS pass transistor 732b, capacitance device 734b, capacitance device 736b, and NMOS pass transistor 738b. The gates of pass transistors 732b and 738b are jointly coupled to receive control signal CNTL7b. Control signals CNTL7a,b can be generated by one or more multiplexers or other circuits located preferably (but not necessarily) near driver circuit 700. Capacitance devices 734a,b and 736a,b are preferably each a varactor, but alternatively can be each a capacitor or combinations of varactors and capacitors.

Equalization driver circuit 700 operates substantially similarly, if not identically, to driver circuit 600—except that driver circuit 700 advantageously has greater programmability with respect to the degree of equalization capability. This greater programmability is provided by the multiple series connections of capacitance devices between two pass transistors. Thus, for example, consider the advantages of circuit 700 having three such series connections having equivalent capacitances of CEQ1, CEQ2, and CEQ3, respectively. Depending on the application in which driver circuit 700 is used, circuit 700 can be advantageously programmed to have no capacitance or any one of the following seven capacitances by manipulating control signals to the pass transistors: 1) CEQ1, 2) CEQ2, 3) CEQ3, 4) CEQ1+CEQ2, 5) CEQ1+CEQ3, 6) CEQ2+CEQ3, and 7) CEQ1+CEQ2+CEQ3. Depending on the capacitance values of the capacitance devices, circuit 700 can be advantageously fabricated to provide a wide range capacitances. This allows circuit 700 to be used in many different applications under a wide range of input signal frequencies and voltage swings.

Figure 8:
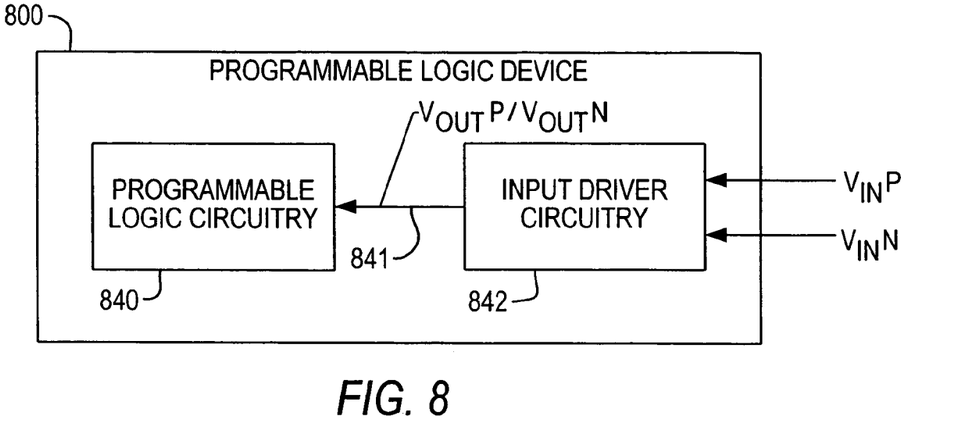
FIG. 8 is a simplified block diagram of illustrative circuitry employing the invention.

Although the circuitry of this invention has many possible applications, one illustrative use is shown in FIG. 8. In FIG. 8, programmable logic device ("PLD") 800 is an integrated circuit, preferably an integrated circuit chip, that includes programmable logic circuitry 840 and input driver circuitry 842 that includes equalization circuitry in accordance with the invention. PLD 800 may be field programmable, mask programmable, or programmable in any other way. It may be one-time-only programmable, or it may be reprogrammable. The programmable logic circuitry 840 of PLD 800 receives a data input signal (or signals) on lead(s) 841 (i.e., one or more parallel conductors) that is (or are) output by input driver circuitry 842. Circuitry 842 converts differential input signals VINP/VINN to output signals VOUTP/VOUTN (or a single output signal VO, not shown) with equalization, as described earlier in this specification. Thus PLD 800 is one illustrative embodiment of receiver circuitry incorporating equalization circuitry in accordance with the invention.

Figure 9:
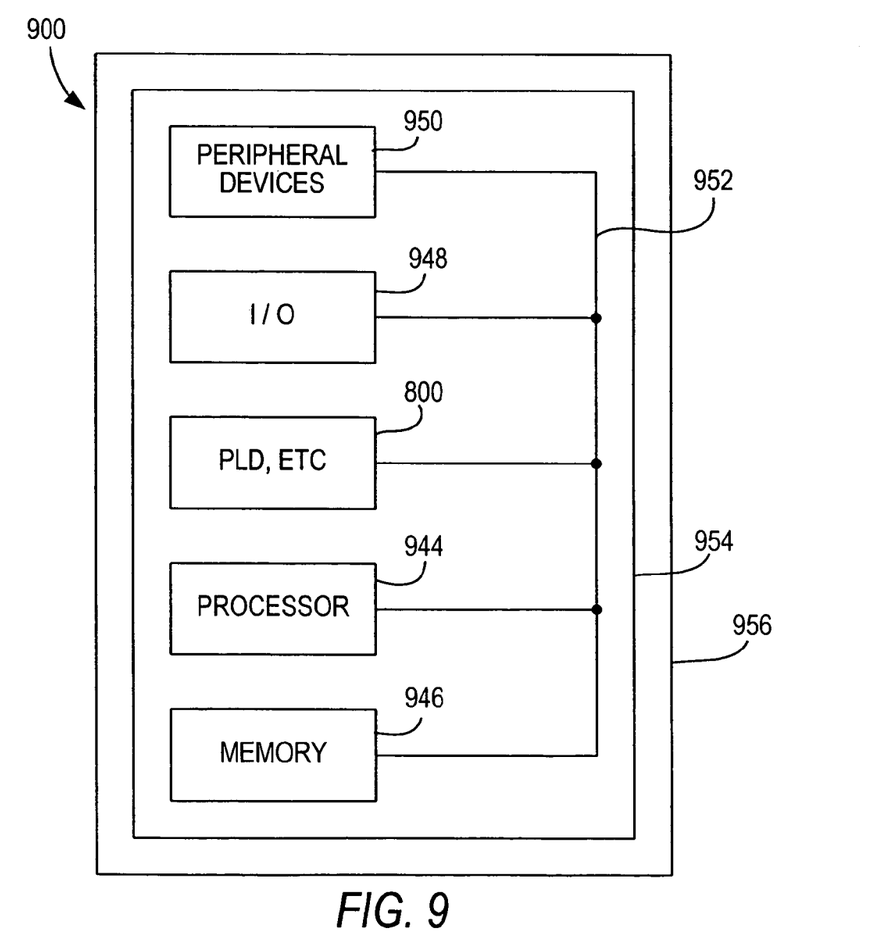
FIG. 9 is a simplified block diagram of an illustrative system employing the invention.

FIG. 9 shows an illustrative larger context in which the invention may be employed. The invention can be used for receiving and equalizing one or more input signals of any one or more of elements 800, 944, 946, 948, and 950 from a system bus or other interconnections 952. Although the invention is equally applicable in many other types of systems, illustrative system 900 shown in FIG. 9 may be generally described as a data processing system.

Data processing system 900 may include one or more of the following components: PLD or other circuitry 800 like that shown in FIG. 8, a processor 944, a memory 946, input/output (I/O) circuitry 948, and peripheral devices 950. These components are coupled together by a system bus or other interconnections 952, and are populated on a circuit board 954 (e.g., a printed circuit board) that is contained in an end-user system 956. Communication among the various components shown in FIG. 9, and/or with external circuitry, may be of any known type to any desired extent.

System 900 can be used in a wide variety of applications, such as computer networking, data networking, instrumentation, video processing, digital signal processing, or the like. Circuitry 800 can be used to perform a variety of different logic functions. For example, circuitry 800 can be configured as a processor or controller that works in cooperation with processor 944. Circuitry 800 may also be used as an arbiter for arbitrating access to a shared resource in system 900. In yet another example, circuitry 800 can be configured as an interface between processor 944 and one of the other components of system 900. Still further, either processor 944, memory 946, or both may include equalization circuitry in accordance with the invention. Note that system 900 is only exemplary and in no way should be construed to limit the true scope and spirit of the invention.

Thus it is seen that programmable differential capacitance is implemented in equalization circuits. One skilled in the art will appreciate that the invention can be practiced by other than the described embodiments, which are presented for purposes of illustration and not of limitation, and the invention is limited only by the claims which follow.

I claim:

1. A method of equalizing voltage transitions of a pair of differential signals, said method comprising:
   conductively coupling a selected value of capacitance between two circuit nodes, said capacitance comprising at least one pair of series-connected capacitive elements;
   receiving said differential signals, one of said signals being at higher voltage than the other of said signals; and
   boosting the transition speed of said differential signals with said conductively coupled capacitance.

2. The method of claim 1 wherein said capacitive elements are capacitors.

3. The method of claim 1 wherein said capacitive elements are varactors.

4. The method of claim 1 wherein said conductively coupling comprises programmably coupling.

5. A method of equalizing voltage transitions of a pair of differential signals, said method comprising:
   conductively coupling a resistor between a first and a second circuit node;
   conductively coupling a first series connection of a first switch, a capacitive element and a second switch in parallel with the resistor;
   receiving said differential signals, one of said signals being at higher voltage than the other of said signals; and
   boosting the transition speed of said differential signals with said conductively coupled capacitive element.

6. The method of claim 5 wherein said capacitive element comprises a capacitor.

7. The method of claim 5 further comprising:
   conductively coupling a second series connection of a first switch, a capacitive element and a second switch between said first and second nodes, said second series connection being coupled in parallel with said first series connection.

8. Equalization circuitry comprising:
   a first node;
   a second node;
   a resistor connected between said first and second nodes;
   a series connection of a first switch, a capacitive element, and a second switch of the same type as the first switch coupled in parallel with the resistor, said first and second switches opening and closing substantially simultaneously.

9. The equalization circuitry of claim 8 wherein said capacitive element comprises one of a capacitor and a varactor.

* * * * *